United States Patent [19]

Kasuga

[11] Patent Number: 4,932,279
[45] Date of Patent: Jun. 12, 1990

[54] FEED SCREW APPARATUS

[75] Inventor: Shinichi Kasuga, Maebashi, Japan

[73] Assignee: Nippon Seiko Kabushiki Kaisha, Tokyo, Japan

[21] Appl. No.: 258,031

[22] Filed: Oct. 14, 1988

[30] Foreign Application Priority Data

Oct. 16, 1987 [JP] Japan ................. 62-158545

[51] Int. Cl.$^5$ ............................................. F16C 29/06
[52] U.S. Cl. ................. 74/424.8 R; 74/89.15; 384/45
[58] Field of Search ........... 74/89.15, 459, 424.8 R; 248/430; 384/45

[56] References Cited

U.S. PATENT DOCUMENTS

| 3,670,583 | 6/1972 | Leming | 74/89.15 |
| 4,426,119 | 1/1984 | Mottate | 384/45 |
| 4,478,462 | 10/1984 | Teramachi | 384/45 |
| 4,576,421 | 3/1986 | Teramachi | 384/45 |
| 4,798,479 | 1/1989 | Morita | 384/45 |

FOREIGN PATENT DOCUMENTS

| 57-140913 | 8/1982 | Japan | 384/45 |
| 59-226713 | 12/1984 | Japan | 384/45 |
| 61-61362 | 4/1986 | Japan | . |

Primary Examiner—Allan D. Herrmann
Assistant Examiner—Janice E. Chartoff
Attorney, Agent, or Firm—Basile and Hanlon

[57] ABSTRACT

In a feed screw apparatus composed of a feed screw shaft and a nut engaged with the feed screw shaft which is movable in the axial direction, a guide rail member having ball rolling grooves in both side surfaces is disposed beneath the feed screw shaft in parallel to and slightly spaced therefrom. The bottom portion of the nut is extended downwardly at both lateral sides to form side walls constituting a linear guide section which sandwiches the guide rail member and has ball rolling grooves in the inner surfaces of the side walls. The outer surfaces of the side walls of the linear guide section are formed with ball rolling grooves, and half tubes respectively facing these ball rolling grooves to form ball return paths are fixed between end caps which are secured at opposite ends of the linear guide section.

4 Claims, 4 Drawing Sheets

FEED SCREW APPARATUS

BACKGROUND OF THE INVENTION

1. Field of the Invention

The present invention relates to a feed screw apparatus, and in particular, to a feed screw apparatus having a compact linear guide means provided to a part of the feed screw apparatus.

2. Description of the Prior Art

A prior art feed screw apparatus having linear guide means combined therewith is disclosed, for example, in Japanese Patent Laid-Open Publication No. 61-61362.

This apparatus comprises a feed screw shaft having a spiral groove formed in the outer surface, a linear guide rail provided on the feed screw in parallel therewith, and a nut block, including a linear guide means, fitted to the linear guide rail and movable in the axial direction, and a nut section, formed integrally with the linear guide means, engageable with the feed screw shaft. The rotational movement of the nut block with respect to the feed screw shaft is prevented by the linear guide means.

By combining the linear guide means with the feed screw, it is possible to simply guide, for example, a table of a machine tool linearly. Additionally, a compact feed unit can be formed by positively and arbitrarily driving, stopping, and positioning utilizing a driving device. In such a combination, since the linear guide means and the feed screw can be worked at the same reference plane, excessive man-hours are not necessary in assembling and adjusting, as in the prior art. Accordingly, an advantage is provided in that the scope of application can be expanded to various fields of application including robotics, automatic transportation devices, and the like.

However, the prior art apparatus mentioned above is a simple combination of the feed screw and a linear guide device as the linear guide means, and is constructed by merely attaching a ball screw device to a slider of a linear guide device. As a result, for example, the size, in a height direction, is substantially equal to a sum of heights of the prior art linear guide device and the ball screw, and, as such, a problem is encountered in that it is impossible to make it small in size and light in weight. Moreover, another problem is posed in that excessive time and large expenditures are required for adjustment, in order to maintain the assembling accuracy.

SUMMARY OF THE INVENTION

It is an object of the invention to provide a feed screw apparatus having a compact, integrally mounted, linear guide section which solves the problems in the prior art.

In the present invention, a feed screw apparatus includes a feed screw shaft having a spiral groove formed in the outer surface, and a nut having a spiral groove corresponding to the spiral groove of the feed screw which engages the feed screw movably in the axial direction. Furthermore, a guide rail member having ball rolling grooves in both side surfaces is disposed in parallel spaced relationship to the feed screw shaft, and a linear guide section is formed by extending slightly the lower sides of the nut downwardly. The linear guide section is formed with ball rolling grooves in inner surfaces, opposing the ball rolling grooves of the guide rail member, and with ball path grooves in outer surfaces extending parallel to the ball rolling grooves in the inner surfaces. End caps are secured respectively to front and rear ends of the linear guide section, and each of the end caps includes a pair of curved ball grooves and a pair of protruding portions which are formed with extended grooves which extend tangentially from the ends of the outer semicircle of each respective curved ball groove. Long, axially extending half-tubes have their ends respectively inserted into the corresponding extended grooves of the opposite end caps to form ball return paths together with the ball path grooves of the linear guide section. The ball return path and the curved ball grooves form an infinite-circulating ball path, and multiple balls are rollably inserted therein. The nut is moved linearly by virtue of the balls, and is guided by the guide rail during the rotation of the feed screw shaft.

When the ball screw shaft is rotated, the nut moves in the axial direction guided by the guide rail. In this case, the linear guide section is moved together with the nut, and the balls fitted in the ball rolling grooves of the guide rail and the respectively opposing ball rolling grooves of the linear guide section move while rolling. The balls are introduced into the curved ball groove of the end cap at one end of the linear guide section to make a U-turn, and pass through the ball return path having a circular cross section constituted by the opposing ball path groove of semicircular cross section formed in the outer surface of the linear guide section and the half tube to reach the curved ball groove of the other end cap at the other end of the linear guide section. The balls make a U-turn again in this curved ball groove and return to the ball rolling groove to repeat the circulation.

The linear guide section is formed by slightly extending a part of the nut. The ball return path, provided on the outer surface of the linear guide section, is constituted by the opposing ball path groove and the half tube. Thus, the ball return path differs from the prior art linear guide apparatus in that the latter is formed by working a through hole in a moving member of a thick-walled block. Accordingly, the apparatus in the present invention is very compact as a whole, and it is easily made lightweight. Furthermore, since the linear guide section and the nut can be machined as a unitary structure, the parallelism and the like among the feed screw hole, the ball rolling groove, and the ball path groove can be formed very accurately. Likewise, the assembly and adjustment can be achieved quickly and accurately.

DESCRIPTION OF THE PREFERRED EMBODIMENT

Figure 1:
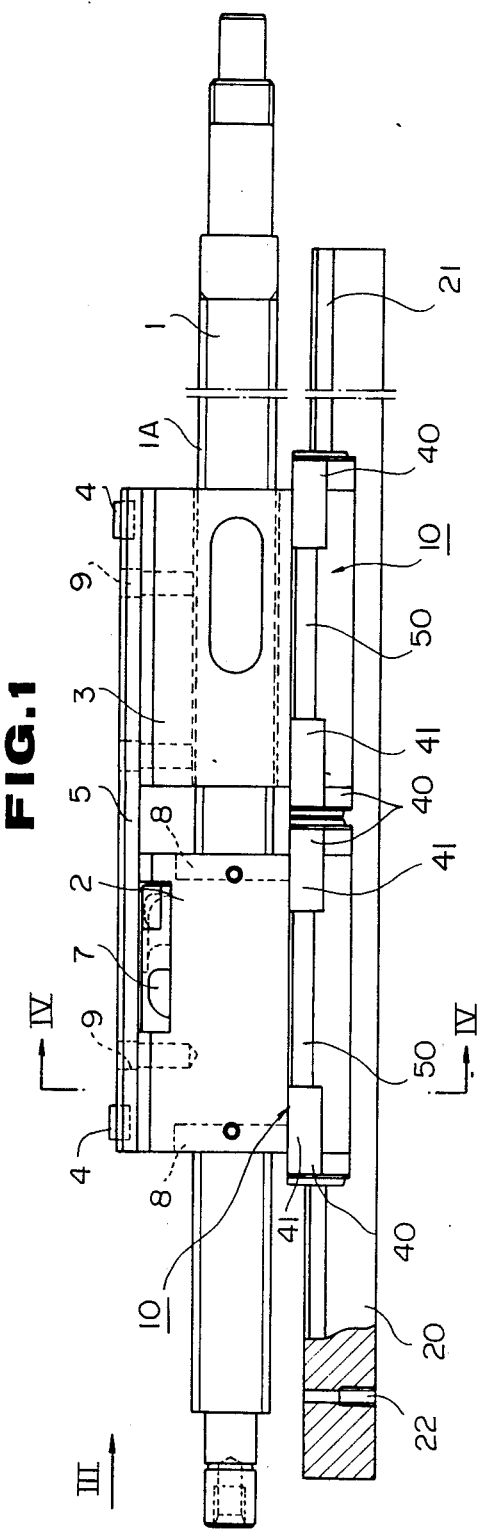
FIG. 1 is a side view of a feed screw apparatus embodying the present invention.

An embodiment of the present invention will be described with reference to the drawings in which identical reference numerals represent identical or equivalent parts throughout the drawings.

FIGS. 1 to 9 show an embodiment of the invention.

A feed screw (in this case, a ball screw shaft) 1 has a spiral groove 1A formed in the outer surface. Feed screw 1 is inserted through axially extending through holes formed in a square nut 2 and a sub-block 3, of substantially the same size as the square nut 2, so that the square nut 2 and the sub-block 3 are movable in the axial direction. The square nut 2 and the sub-block 3 are connected to move as a unitary structure by a connecting plate 5, secured to the upper surfaces of the square nut 2 and the sub-block 3 by screws 4, constitute the feed screw apparatus.

Figure 2:
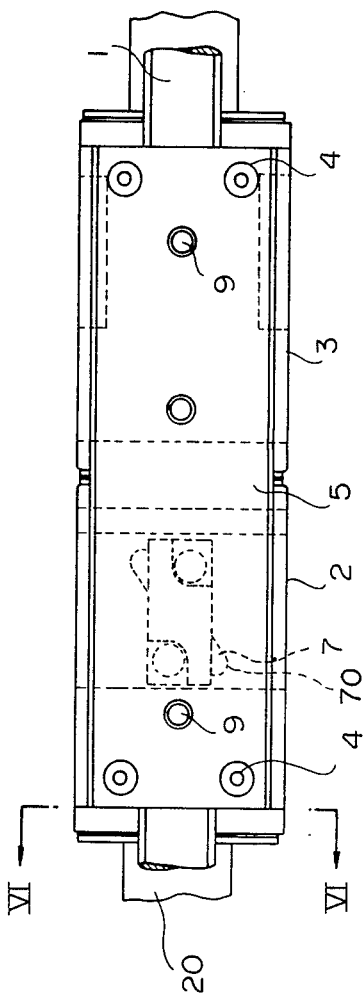
FIG. 2 is a plan view of the feed screw apparatus of FIG. 1.
Figure 3:
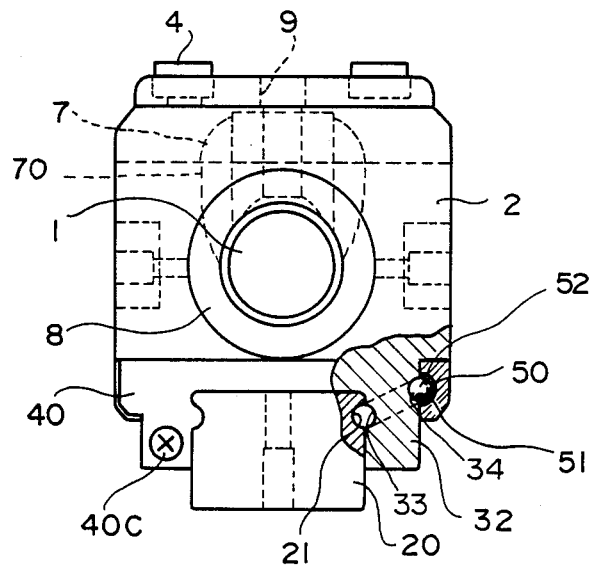
FIG. 3 is a front view, partially in section, of the feed screw apparatus as viewed according to the arrow III in FIG. 1.
Figure 4:
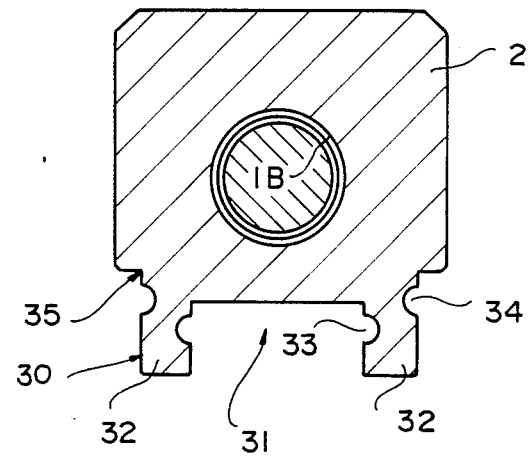
FIG. 4 is a sectional view taken along the line IV-IV in FIG. 1.
Figure 5:
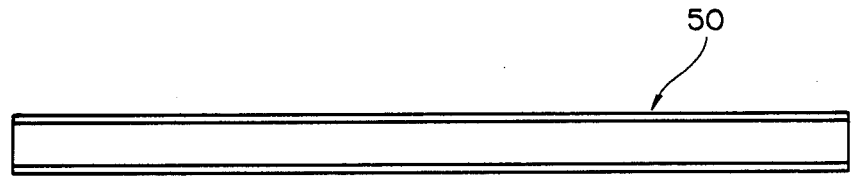
FIG. 5 is a side view of the half tube shown in FIG. 1.
Figure 6:
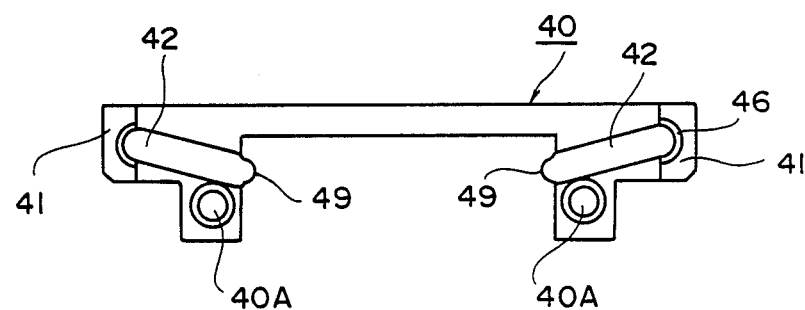
FIG. 6 is a rear view of the end cap portion taken along the line VI-VI in FIG. 2.
Figure 7:
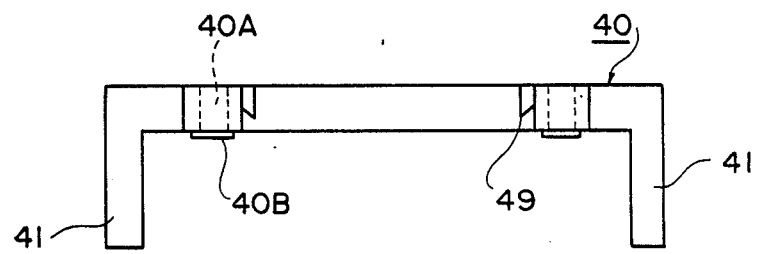
FIG. 7 is a plan view of the end cap portion shown in FIG. 1.
Figure 8:
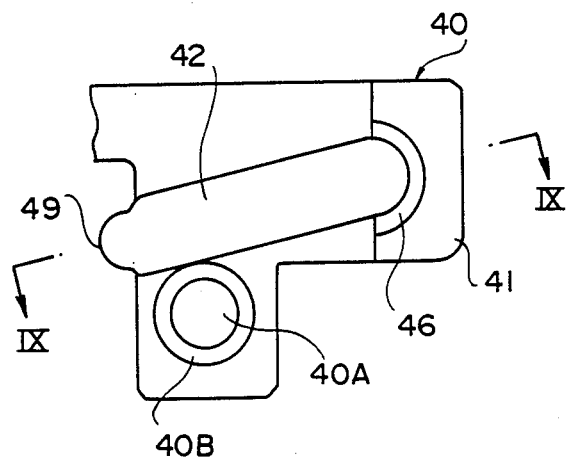
FIG. 8 is an enlarged view of a part of FIG. 6.
Figure 9:
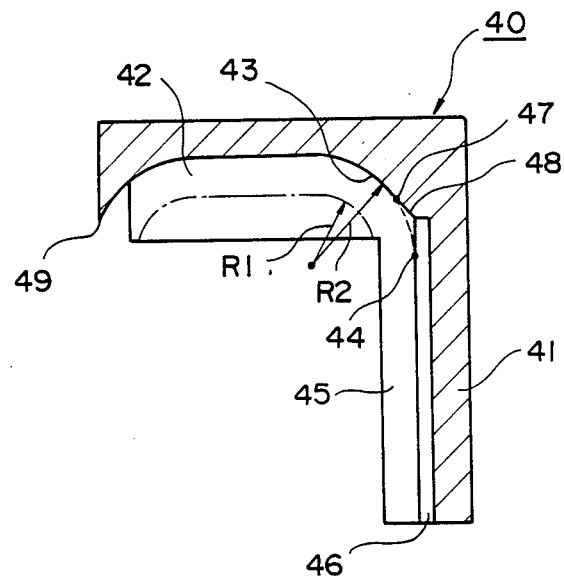
FIG. 9 is a sectional view taken along the line IX-IX in FIG. 8.

The through hole extending in the axial direction at the central portion of square nut 2, has a spiral groove 1B corresponding to the spiral groove 1A of the feed screw shaft 1 formed in a part of its inner surface. Holes 70, see FIGS. 2 and 3, are bored in the square nut 2, vertically or substantially perpendicular to the axis of the square nut 2 and positioned at both sides of the axis. A curved U-shaped ball tube 7 is inserted having both legs inserted into the holes 70, respectively, so as to be in communication with the spiral groove 1B to form a rolling member circulating path. Multiple balls (not shown), for use as rolling members, are rollably fitted between the spiral grooves 1A and 1B, and these rolling members advance while rolling between both the spiral grooves 1A and 1B. Since the tube 7 is in communication with the spiral grooves 1A and 1B at both ends of the tube 7, the balls which move through the spiral grooves 1A and 1B are picked up by the ends of the tube 7, circulate through the tube 7, and return to the path between both the spiral grooves 1A and 1B to complete circulation. This circulation is subsequently repeated. At opposite ends of the through hole of the square nut 2, dust seals 8 are provided which are constructed of, for example, rubber, plastic, or the like. The dust seals 8 act to wipe out the surface of the spiral groove 1A.

The reference numeral 9 designates a screw hole for a bolt for mounting a member on the square nut 2 and the sub-block 3.

The diameter of the through hole formed at the central portion sub-block 3, for inserting the feed screw shaft 1 is made larger than the diameter of the feed screw shaft 1 so that the inner surface of the through hole does not contact the feed screw shaft 1, and no spiral groove, as in the square nut 2, is formed in the through hole.

A linear guide mechanism 10 is provided for each of the square nut 2 and sub-block 3 to guide these members during linear movement along the feed screw shaft 1. The linear guide mechanism 10 is the same for both the square nut 2 and the sub-block 3, and hence, only the linear guide mechanism 10 provided to the square nut 2 will be described.

The linear guide mechanism 10 includes an axially extending guide rail member 20, a linear guide section 30 loosely fitted to the guide rail member 20 in a straddling relationship therewith so as to be movable in the axial direction, and end cap sections 40 joined respectively to axial ends of the linear guide section 30.

The guide rail member 20 has axially extending ball rolling grooves 21 respectively formed in both side surfaces. The guide rail member 20 is secured to a base (not shown) or the like in parallel to the feed screw shaft 1 spaced slightly therefrom. A plurality of axially spaced screw holes 22 are formed penetrating the guide rail member 20 vertically. Bolts (not shown) may be inserted through the screw holes 22 to secure the guide rail member 20 to the base or the like. The ball rolling grooves 21 have a cross section of a so-called Gothic arch shape, in which two circular-arc surfaces having different centers are formed in a substantially V-shape.

The linear guide section 30 is formed by extending lateral side portions of the square nut 2 downwardly so as to face guide rail member 20. At the axial central portion of the extended portion of the linear guide section 30, there is formed an axially extending recess 31, shown in FIG. 4. The upper part of the guide rail member 20 is fitted loosely within the recess 31. Side walls 32 are formed at both sides of the recess 31, and ball rolling grooves 33 are respectively formed in inner surfaces of the side walls 32 corresponding respectively to the ball rolling grooves 21 of the guide rail member 20. The ball rolling grooves 33 have the cross section of the Gothic arch shape. Furthermore, ball rolling grooves 34, having a semicircular cross section, are formed in the outer surfaces of both the side walls 32, extending parallel to the ball rolling grooves 33 formed in the inner surfaces. The width between the outer surfaces of side walls 32 is made smaller than the width between the side surfaces of the square nut 2 so that stepped portions 35 are formed at the boundaries between the square nut 2 and the linear guide section 30.

An end cap 40 is provided at each axial end of the linear guide section 30, and it has a generally U-shaped configuration, conforming to the cross sectional shape of linear guide section 30 and recess 31. The end cap section 40 has protruding sections 41 at the width-wise ends thereof, which are fitted into the stepped portions 35 of the side walls 32 of the linear guide 30.

The end cap 40 has a pair of right and left curved ball grooves 42. The ball rolling groove 21 at the side surface of the guide rail member 20, and the opposing ball rolling groove 33 at the inner surface of the linear guide section 30, are brought into communication with the ball rolling groove 34 at the outer surface of the linear guide section 30 by the curved ball groove 42. The protruding sections 41 each have an extended groove 45 formed in the inner surface, having a semicircular cross section such that the extended groove 45 extends in a tangential direction from a terminating point 44 of an outer semicicle 43 having a radius R2 of the curved ball groove 42 whose radius of the curve at the center line is R1. Furthermore, an axially extending half tube, inserting groove 46 is formed in the inner surface of the extended groove 45. An end point of the depth of the half tube inserting groove 46 is selected to be at a deep position at which a line along the groove 46 intersects a straight line approximated by a tangent at a point 47 shortly before the center of the outer semicircle 43 of the curved ball groove 42. An end portion of the outer circular-arc surface of the curved ball groove 42, at which the curved ball groove 42 is adjacent to the ball rolling groove 21, protrudes axially at an acute angle so as to approach the bottom of the ball rolling groove 21 thereby forming a ball scooping end portion 49.

Screw holes (not shown) are formed in the end surface of the side walls 32 of the linear guide section 30. Corresponding screw inserting holes 40A, having guide protrusions 40B protruding annularly around the circumference of the screw inserting holes 40A, are formed in the portion of the end cap section 40 abutting against the end surface of the side walls 32 of the linear guide section 30. The end cap section 40 is attached to the end surface of the linear guide section 30 by engaging the guide protrusions 40B with corresponding annular recesses (not shown) positioned about the circumference of the screw holes in the side walls 32, and by tightening screws 40C inserted into the screw inserting holes 40A.

A half-tube 50, for example, made of metal and having a semicircular cross section, is fitted into the half tube inserting groove 46 of the end cap section 40. The half tube 50 is inserted to reach the deeper position than the terminating point 44 of the curved ball groove 42. As a result, it is possible to support the half tube 50 and to prevent the rotation thereof. In this position, the half tube 50 opposes the ball path groove 34 formed in the outer surface of the side wall 32 to form a ball return path 51 extending between the half tube 50 and the ball path groove 34.

A ball circulating route is formed by the ball return path 51, the curved ball grooves 42, and the ball rolling path constituted by the opposing ball rolling grooves 21 and 33. Multiple balls 52 are inserted rollably in this ball circulating route.

In operation, when the feed screw shaft 1 is rotated by a driving means, such as a servomotor (not shown), in a forward direction or a reverse direction, due to the rolling of the rolling members fitted into the spiral groove 1A of the feed screw shaft 1 and the spiral groove 1B of the square nut 2, the square nut 2 is advanced or retarded in the axial direction. In this case, the rolling members circulate through the ball tube 7. The sub-block 3, which is connected by the connecting plate 5, to the square nut 2, is moved together with the square nut 2. Since the sub-block 3 absorbs oscillation of the square nut 2 through the connecting plate 5, which is caused when eccentricity is present in the feed screw shaft 1, the linear travelling property of the sub-block 3 is improved.

The linear guide mechanism 10 prevents rotation of the square nut 2 and the sub-block 3 about the feed screw shaft 1 so that the square nut 2 and the sub-block 3 move linearly along the axial direction of the guide rail member 20 accurately. Specifically, the square nut 2 and the sub-block 3 are supported by many balls which are fitted into the ball rolling groove constituted by the opposing ball rolling grooves 21 and 33 of the guide rail member 20 and the linear guide section 30, respectively, which circulate infinitely through the ball circulating route. Accordingly, oscillations of the square nut 2 and the sub-block 3, such as rolling, yawing, and pitching are completely prevented.

In this case, the infinite circulation of the balls in the linear guide mechanism 10 is performed in the following manner. When the linear guide section 30, positioned on the guide rail member 20, moves in the axial direction together with the square nut 2, the balls 52 inserted into the ball rolling path, constituted by the ball rolling grooves 21 and 33, roll and move in a direction opposite to the direction of movement of the linear guide section 30. At the end portion of the linear guide section 30, the balls 52 are scooped, by the protruding end portion 49 of the curved ball groove 42 formed in the end cap section 40, and introduced to the curved ball groove 42 to change the direction of circulation by making a U-turn.

Following the change of direction, the balls 52 pass through the ball return path 51 constituted integrally by the ball path groove 34 formed in the outer surface of the side wall 32 of the linear guide section 30 and the half tube 50 opposing ball path groove 34 to reach the end cap portion 40 at the opposite end of linear guide section 30. The balls 52 again make a U-turn in the curved ball groove 42 in the end cap portion 40, and return to the ball rolling path constituted by the ball rolling grooves 21 and 33 to repeat the circulation of movement while rolling.

During the circulating movement, the rolling of the balls 52 is performed very smoothly. This is due to the fact that the ball return path 51, which returns the balls 52 after the U-turn in the end cap portion 40, is constituted by ball rolling groove 34 having a semicircular cross section and half tube 50, both of which are easily machined to smooth surfaces. Where the ball path 51 is formed by a drilled through hole, as in the prior linear guide apparatus, the inner surface will be rough, particularly when the hole is long and deep, and the smooth rolling of the balls is difficult. Moreover, as the diameter of the hole is small and the depth of the hole is large, the machining is difficult and the cost is increased. However, in the present invention, even when the hole is long, it is only necessary to machine the groove which is easy to work and, for example, by utilizing draw machining, the reduction of the cost can, to a great extent, be achieved.

Moreover, in the present invention, the ball return path 51 of the linear guide mechanism 10 is formed by inserting the half tube 50 into the half tube inserting groove 46 deep enough so that the end of the half tube 50 is positioned beyond the terminating point 44 of the curved ball groove 42. Therefore, a stepped portion, which would disturb the smooth rolling of the balls 52 in the ball return path 51, is not formed, and further, the rotation of the inserted half tube 50 is also prevented completely.

By using the structure of preventing the rotation of the half tube 50, high rigidity is ensured against a load in the rolling direction of the linear guide mechanism 10. In addition, since the half tube 50 is never displaced laterally, so as to narrow the ball return path, so as to form a stepped portion on the ball travelling portion, the stable circulation of the balls is realized.

Furthermore, in the present invention, the linear guide mechanism 10 can be formed in association with a part of the moving member such as the square nut 2 and the sub-block 3, the feed screw apparatus is necessarily compact as a whole, and can be made light in weight.

While certain embodiments of the invention have been described in detail above in relation to a feed screw apparatus, it will be apparent to those skilled in the art that the disclosed embodiment may be modified. Therefore, the foregoing description is to be considered exemplary rather than limiting, and the true scope of the invention is that defined in the following claims.

What is claimed is:

1. In a feed screw apparatus including a feed screw shaft having a spiral groove in an outer surface, and a nut having a spiral groove in an inner surface, the spiral groove of said nut corresponding to the spiral groove of said feed screw shaft so that said nut engages said feed screw shaft through a plurality of balls to move in an axial direction by rotation of said shaft, an improvement comprising:

- a guide rail member having a pair of axially extending bell rolling grooves respectively formed in both outer side surfaces, said guide rail member being disposed in parallel to said feed screw shaft and spaced slightly therefrom;
- a linear guide section, having a front and a rear end face, formed integrally by extending lateral sides of a bottom portion of said nut toward said guide rail member to form spaced side walls extending in parallel planar relationship on each side of said guide rail member, said linear guide section having a first pair of ball rolling grooves respectively formed in inner surfaces of said side walls respectively opposing the ball rolling grooves of said guide rail member and having a second pair of axially extending ball rolling grooves respectively formed in outer surfaces of said side walls in parallel with said first pair of ball rolling grooves in said inner surfaces of said side walls;
- end cap sections respectively secured to said front and rear end faces of said linear guide section, each of said end cap sections having a pair of curved ball grooves and a pair of protruding sections, respectively, said protruding sections having extended grooves each extending tangentially from a terminating end of an outer semicircle of said curved ball groove;
- a pair of axially extending half tubes, each of said half tubes having opposite ends respectively inserted into corresponding opposite extended grooves of said end cap sections, said half tube constituting a ball return path together with corresponding one of said ball rolling grooves formed in said outer surfaces of said linear guide section;
- a plurality of balls inserted into a pair of ball circulating routes, each of said ball circulating routes being constituted by said ball return path, said curved ball grooves in said opposite end caps sections, said opposing ball rolling grooves of said guide rail member, and said first ball rolling grooves of said linear guide section; and
- wherein said nut is guided by said guide rail member, through rolling of said multiplicity of balls, when said feed screw shaft is rotated to move said nut linearly.

2. An apparatus according to claim 1, wherein each end of said half tube is inserted into an extended groove of a protruding section of said end cap, the utmost end of said half tube being inserted beyond a terminating end of an outer semicircle of the curved ball groove, and the inserted end portion of said half tube being fitted to said extended groove.

3. An apparatus according to claim 1, wherein said second pair of ball rolling grooves are formed respectively at base portions of said side walls of said linear guide section so that said second pair of grooves are aligned laterally with a bottom surface of an axially extending recess of said linear guide section to allow elastic deformation of said side walls.

4. An apparatus according to claim 1, further comprising:
- a sub-block having an axially extending through hole for loosely inserting said feed screw shaft therethrough, a linear guide section for guiding said sub-block linearly along said feed screw shaft, end cap sections respectively secured to front and rear end faces of said sub-block, a pair of axially extending half tubes each having opposite ends respectively fixed to said end cap sections, and a plurality of balls inserted into a pair of ball circulating routes formed in said end cap sections, said pair of half tubes, and said guide rail member; and
- a connecting plate for connecting said sub-block to said nut axially spaced from each other so that said nut and said sub-block are respectively fitted on said guide rail through said plurality of balls.

* * * * *